United States Patent
Eitel et al.

[11] Patent Number: 5,933,828
[45] Date of Patent: Aug. 3, 1999

[54] METHOD OF STRUCTURING A DATABASE OF A CONTROL SYSTEM FOR ACCESS BY THIRD PARTY SOFTWARE

[76] Inventors: Robert T. Eitel, 7N7783 Sayer Rd., Bartlett, Ill. 60103; Paul D. Swardstrom, 5S581 Campbell Dr., Naperville, Ill. 60563

[21] Appl. No.: 08/876,855

[22] Filed: Jun. 16, 1997

[51] Int. Cl.$^6$ .............................. G06F 17/30; H04M 3/00
[52] U.S. Cl. ............................ 707/10; 707/100; 707/101; 707/102; 395/706; 395/708; 379/265; 379/266
[58] Field of Search .................. 707/10, 1–3, 100–102; 379/265, 266, 309; 395/705–709, 712

[56] References Cited

U.S. PATENT DOCUMENTS

| | | | |
|---|---|---|---|
| 5,500,891 | 3/1996 | Harrington et al. | 379/265 |
| 5,533,109 | 7/1996 | Baker | 379/201 |
| 5,544,232 | 8/1996 | Baker et al. | 379/210 X |
| 5,546,455 | 8/1996 | Joyce et al. | 379/265 |
| 5,546,456 | 8/1996 | Vilsoet et al. | 379/265 |

*Primary Examiner*—Thomas G. Black
*Assistant Examiner*—Hosain T. Alam
*Attorney, Agent, or Firm*—Welsh & Katz, Ltd.

[57] ABSTRACT

An apparatus and method is provided for structuring a database of an automatic control system for common access by a third party software application and an automatic control system application of the automatic control system the database being generated using a set of database modeling tools. The method includes the steps of defining a set of parameters for the database and implementing the database for the set of parameters under a standard query language using the modeling tools. The method further includes the steps of generating a set of database headers using the modeling tools; and compiling an object code for the automatic control system application and third party software application using the database headers.

18 Claims, 1 Drawing Sheet

METHOD OF STRUCTURING A DATABASE OF A CONTROL SYSTEM FOR ACCESS BY THIRD PARTY SOFTWARE

FIELD OF THE INVENTION

The field of the invention relates to databases and, in particular, to methods of allowing access to the database by third-party software products.

BACKGROUND OF THE INVENTION

A database is an important element of most information processing systems. Databases often provides a repository for raw data developed for the information processing system in advance of processing, either for short periods, while the information is being processed or long term (e.g., for archival purposes). Any determinations (i.e., processed results) made by the information processing system may also become part of the information stored in the database. Programming information about the information processing system including boot files and applications programming may also be included in the database.

In general, many large companies would find it difficult to function without a common database. The common database often provides a focus point through which it may coordinate it's efforts. Activities of sales personnel may be tracked, measured and stored in the common database using automatic order entry applications. Other applications may determine a need for and order raw materials for a manufactured product based upon the order entries found within the database. Still further applications may develop and store a production schedule in the database for use by a production department based upon the entered orders and delivery schedules of the ordered raw materials.

Optimization applications within the data processing system may track production performance, such a overall defects or defects per stage of the production process. Textual and graphic displays may display production performance at key processing steps, to reduce rejects and improve quality.

In other manufacturing processes, the data processing system may be relied upon to calculate and provide overall manufacturing operating parameters (e.g., processing temperature, dimensional data, processing time, etc.). Often process monitoring and control may be provided through specific applications running on the data processing system for purposes of tracking and providing closed-loop control of the process.

In other service industries (e.g., telecommunications), a database may be used as a means of tracking services provided. In a public switch telephone network (PSTN), a file may be created for each subscriber and charges appended to the file whenever a call is placed. (Additional charges may be added (or a multiplier used) for long distance calls). Tracking information may also be added to call data stored in the database to indicate a destination and time of the call.

Further, a database is often necessary in the execution of call placement. In performing the call-routing services expected, call-routing data is often stored in a database of the call processing system to allow the call processing system to perform the expected services. For example, a telephone switch must have the capability to differentiate local calls from long distance calls and route those calls appropriately. Often a called number must be compared with a host of call tables to determine how to route the call. Further, once a call destination is determined, a call processor may still have to identify a trunk line (e.g., land lines, T-1 lines, etc.) serving the call destination. Only after determining how to set up the call may the call be completed and the database updated with subsequent billing information.

Private branch exchanges (PBXs) may have similar database needs, but for different reasons. For instance, calls placed from within the PBX must be differentiated as to their destinations being either external or internal. Further, a service level for each call routed to an external destination (out-going call) may need to be determined by a call processor of the PBX by reference to a database during the processing of each call. For example, some telephones within a PBX may be blocked from making external calls. Other telephones may be given access to outside telephone services, but may still be blocked from making long-distance calls.

Following a determination of service level, the call processor may be expected to route the out-going call, again by reference to the database. First the PBX call processor may select an external trunk line connected to the PSTN. Second, the PBX call processor may transfer the called number to the PSTN for further processing and for making the final connection.

Incoming calls to a PBX may also have similar database needs. For example, incoming calls to agents of a service department of a manufacturing organization may be routed via an automatic call distributor (ACD). The organization may have a common telephone number and incoming calls may be placed in a queue and distributed to agents on a first available basis. Further, incoming calls may be overflowed to another ACD when the time in the queue exceeds a threshold value.

Further, specialized applications within the ACD may generate agent performance data (e.g., time per call, calls per day, etc.) which may also be included within the database. Other application may monitor and generate data on the performance of the ACD (e.g., time in queue, call overflows, etc.).

While databases in general have a tremendous utility as sources of data, the computer applications which generate and use those databases are often custom designed. Often the data files are created specifically for the application (and the efficient operation of the application) with no thought to access by other applications (e.g., third-party software). Because of the importance of databases in general, a need exists for a method and apparatus for generating databases that are compatible with third party software.

SUMMARY

Accordingly, it is an object of the invention to provide an apparatus and method of structuring a database that may be accessed by multiple applications.

It is a further object of the invention to provide a method of structuring databases that is compatible with commonly available software tools.

These and other objects are provided by an apparatus and method for structuring a database of an automatic control system for common access by a third party software application and an automatic control system application of the automatic control system, the database being generated using a set of database modeling tools. The method includes the steps of defining a set of parameters for the database and implementing the database for the set of parameters under a standard query language using the modeling tools. The method further includes the steps of generating a set of database headers using the modeling tools; and compiling an object code for the automatic control system application and third party software application using the database headers.

DETAILED DESCRIPTION OF A PREFERRED EMBODIMENT

Figure 1:
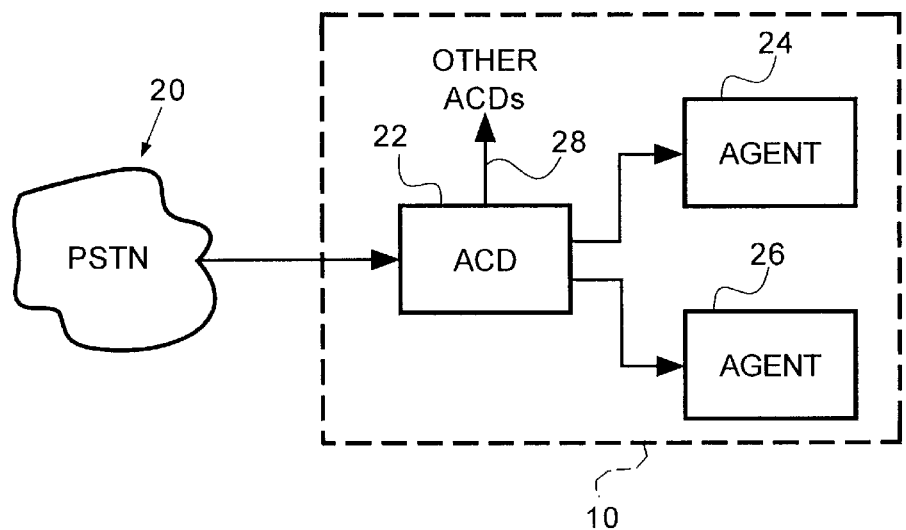
FIG. 1 is a block diagram of a private branch exchange under an embodiment of the invention.

FIG. 1 is a block diagram of PBX 10, in general, in accordance with an embodiment of the invention. As shown, the PBX 10 includes a ACD 22 which receives calls from the PSTN and distributes the calls to agents 24, 26, either on a first available basis or based upon some criteria, unique to the PBX 10 (determined by contig).

The PBX 10 may operate with a single ACD 22, or a number of ACIDS 22 may be operated in parallel. Operation of a number of ACIDS 22 in parallel may be useful where the number of incoming calls exceeds a level where a local group of agents 24, 26 can efficiently handle the load without help. In such a case, calls may be overflowed to another ACD 22 through interconnect lines (i.e., tie lines) 28 or through the PSTN 20.

Figure 2:
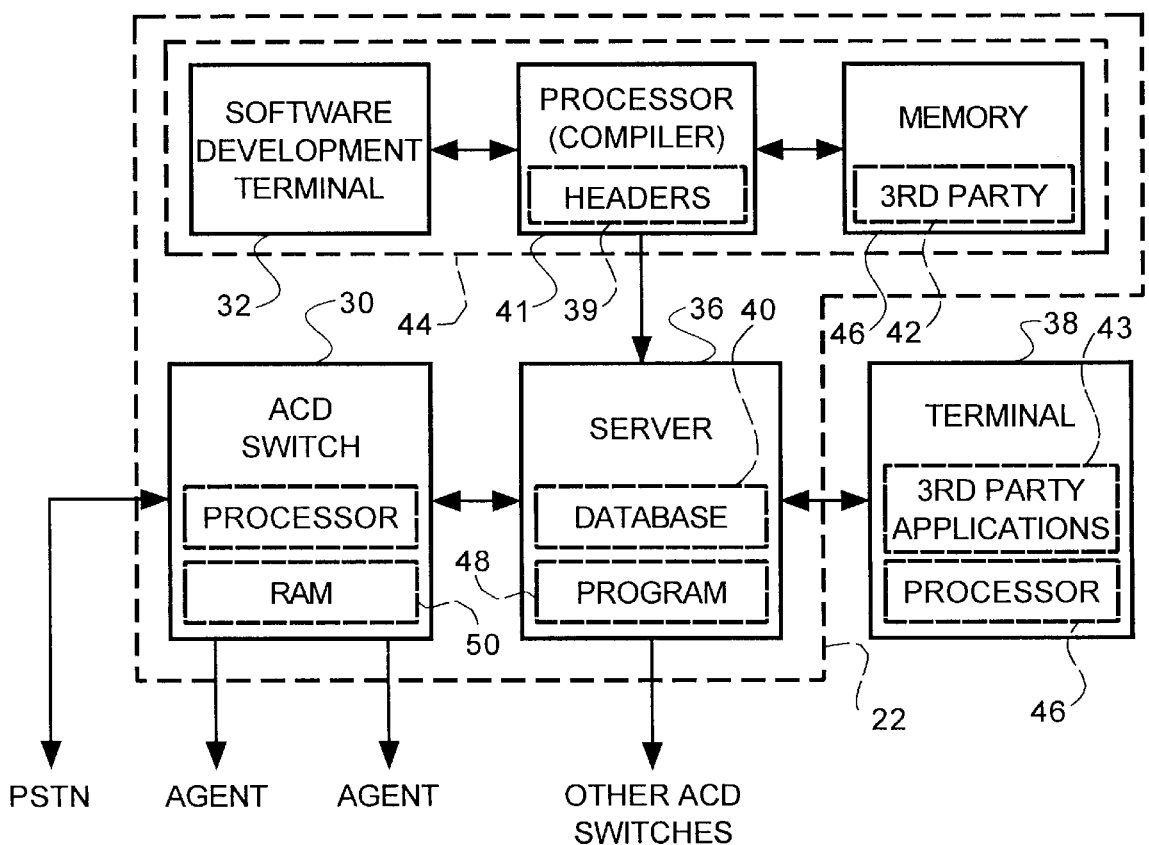
FIG. 2 is a block diagram of an automatic call distributor of the private branch exchange of FIG. 1.

FIG. 2 is a block diagram of an ACD 22 of the PBX 10 of FIG. 1. As shown, the ACD 22 of FIG. 2 is interconnected with a server 36. The server 36 maintains the database 40 used by the ACIDS 22 for both data and control functions.

In operation, a call may be initially received from the PSTN 20 by the ACD 22. Upon receipt of the call, a number of attributes of the received call (e.g., ANTI, DNIS, etc.) are transferred from the PSTN 20 to the ACD 22. The data fields may be forwarded to the server 36 for entry into the database 40 for purposes of call tracking and performance monitoring. A dialed number identification service (DNIS) number and/or a automatic number identification (ANI) (also, sometimes, referred to as caller ID) may be received and be entered into the database 40 of the server 36 along with a uniquely generated call number. Other information about the call such as a trunk group number and trunk number may also be received and stored in the newly created call processing file. Further, where the incoming line is an 800 or 900 number where a caller cannot block a caller ID process, the data may also include indication that the caller has attempted to block the caller ID process.

Information such as the ANTI number may be used by a processor of the ACD switch 22 to search the database 40 of the server 36 to identify the caller. Upon identifying the caller, other records of the database 40 may be searched to retrieve a customer file. An identifier of the customer file may also be placed in the call processing file.

Upon identifying the caller, the ACD 22 may place the call in a queue for subsequent delivery of the call to an agent 24, 26 along with a customer file. The call may be delivered by creating a signal path through the switch 22, while at the same time delivering a customer file to a computer display of the agent terminal 24, 26 in the form of a screen-pop.

While the call is in the queue, the processor of the ACD 22 periodically updates a timer measuring the total time that the call has been in the queue. The total time in the queue is also stored in the database 40 as part of the call processing history in the call file.

Where certain criteria is met (e.g., the call has spent too much time in the queue), the call may be overflowed to a destination ACD 22. As part of the call transfer, an identifier of the call record may be overflowed to the destination ACD 22 along with the call, allowing the destination ACD 22 to access the call processing file within the database 40 of the server 36.

Under the embodiment, the call processing files of the database 40 may be implemented within a relational database supplied by Oracle Corp. of San Francisco, Calif. Access to the database for purposes of monitoring, modeling and altering the performance of the ACD 22 may be provided through third-party applications 43 written specifically to control and track the operating performance of the ACD 22.

Common access to the database 40 by the third party software 43 and control applications of the ACD 22 may be accomplished by configuring the database 40 for use by both types of applications. An appropriate configuration may be accomplished through the use of software modeling tools 42 (e.g., ERI from Embarcadero of San Francisco, Calif.; ERWIN from Logic Works of Princeton, N.J.; INTELLIGENT OBJECTS from InnerX of Cartersville, Ga.; PERSISTENCE from Persistence Software, Inc.; etc.).

Allowing access to the database 40 by the third-party software 43 allows the functionality and interoperability of the ACD 22 to be expanded through the use of the third party software 43 loaded within an associated terminal 38. Under the embodiment, both the ACD 22 and the third party software 43 are each allowed access to each file of the database 40 on a non-coincidental basis. It may also be assumed for purposes of discussion that the software of the ACD 22 and of the third party software 43 of the terminal 42 are not compatible with each other even though the database 40 is compatible with both the software of the ACD 22 and the third-party software of the terminal 38.

For purposes of simplicity, a couple of concepts need to be developed before beginning an explanation of how the database 40 may be generated. The first concept is that some level of software development must be available through a software development system 44 of the ACD 22. The software development system need not be capable of substantive software development, but does require the presence of at least a compiler 42 to recompile previously developed software for the ACD 22.

While the software development system 44 is shown as being part of the ACD 22, it is to be understood that the software development system 44 could be part of a stand-alone system. Where the software development system 44 is a stand-alone system, then a compiled program may be downloaded into the server 36 through use of a tape-reader (not shown) or otherwise.

The software development system 44 may also include a copy of the third party software development tools 42 within a memory 46 for purposes which will soon become apparent. The third party software development tools 42 may be accessed by the terminal 32 as necessary.

It is to be understood that the terminal 38 could be implemented as part of the software development system 44. However, for purposes of simplicity the two blocks are shown as separate entities to facilitate a better understanding of the process.

To achieve compatibility between the data within the database 40 and each of the ACD 22 and third party software 42 of the terminal 38, a four-step process is used. For purposes of explanation, examples will be offered as to how compatibility is accomplished for exemplary files of the database 40 used by the ACD 22. For example, a call processing file may be defined and may include three variable (e.g., ANI number, DNIS number, time in queue, etc.).

To create a compatible database accessible for both ACD 22 and the third-party software 42, the process begins by defining a database structure schema (i.e., a set of parameters (variables) for each file of the database). Using the above example, a call file may be defined for an incoming call to include ANI number, DNIS number and time in queue.

As a second step, the file is implemented in the database 40 by calling up the third-party software modeling tools 42 through the software development terminal 32. The variables are entered and the third-party software is used to create the data files in the database 40 under a standard database format using standard query language (SQL). As part of file implementation into the database, a number of things must be defined including the number of variables, size of each variable (e.g., number of bits) and number of data fields of each variable that may be simultaneously stored. The variables are defined to be mappable into the controlling program of the ACD 30.

As a third step, the design tools of the third party software 42 are used to generate a set of headers 39 for each variable. The headers define the access protocols necessary for common access to the data within the database 40.

As a final step, the headers are substituted for the corresponding parameters (variables) within a source code program controlling the ACD switch 30. The source code program will be written for that purpose through the terminal 32 or it may have been previously written and stored in a program area 48 of the database 40. In either case, once the headers have replaced the original variables, the source code may then be recompiled within a compiler 42 and stored in a program area 48 of the server 36. Fields and tables that were created using the old variables are rebuilt within the server 36 to provide continuity between the old and new data.

The third party software 43 is recompiled in the same way using the headers 39 generated using the software modeling tools 42. The recompiled third party software applications 38, similarly, may be stored in a program area 48 of the server 36.

When the ACD switch 30 is rebooted, the recompiled program is retrieved from the server 36 and stored in RAM 50 of the ACD switch 30. As the ACD switch 30 processes calls, the recompiled program stores data into the database 40 originally created by the third party modeling tools 42.

Similarly, when the terminal 38 is rebooted, the recompiled third party applications 43 are loaded into a RAM 43 of the terminal 38. Alternatively, the recompiled applications 43 may be downloaded into a local boot file (not shown) within the terminal 38.

An operator (not shown) may access the database 40 through the terminal 38 using the third-party software 42. Data may be summarized or fixed thresholds (e.g., overflow criteria) may be changed through the terminal 38.

The use of the third party database design tools 42 allows for the creation of a database that has greatly enhanced accessability. Such a database may be accessed by custom applications developed specifically for the industry or by general purpose programs specifically developed for statistical manipulations.

A specific embodiment of structuring a database according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

We claim:

1. A method of structuring a database of an automatic control system for common access by a third party software application and an automatic control system application of the automatic control system, the database being generated using a set of software modeling tools, such method comprising the steps of:

defining a set of parameters for the database;

implementing the database for the set of parameters under a standard query language using the modeling tools;

generating a set of database headers using the modeling tools; and compiling an object code for the automatic control system application and third party software application using the database headers.

2. The method of structuring a database as in claim 1 wherein the step of implementing the database further comprises defining a set of tables for the set of parameters.

3. The method of structuring a database as in claim 2 wherein the step of defining a set of tables further comprises structuring the set of tables into the database.

4. The method of structuring a database as in claim 1 further comprising the step of loading the database headers into a database memory of the automatic control system.

5. The method of structuring a database as in claim 1 further comprising the step of loading the compiled object code into a processor of the automatic control system.

6. The method of structuring a database as in claim 1 further comprising the step of loading the compiled object code and database headers into a memory of a processor of the automatic control system.

7. An apparatus for structuring a database including a set of parameters of an automatic control system for access by a automatic call distributor control application and a third party software application using a set of software modeling tools, such apparatus comprising:

means for implementing the database for the set of parameters under a standard query language;

means for generating a set of database headers from the implemented database; and mean for compiling an object code for the automatic control system control application and the third party software application using the database headers.

8. The apparatus for structuring a database as in claim 7 wherein the means for implementing the database further comprises a means for defining a set of tables for the set of parameters.

9. The apparatus for structuring a database as in claim 8 wherein the means for defining a set of tables further comprises means for structuring the set of tables into the database.

10. The apparatus for structuring a database as in claim 7 further comprising means for loading the compiled third party software application into a controller of a terminal operably connected with the database.

11. The apparatus for structuring a database as in claim 7 further comprising means for loading the compiled object code of the automatic control system control application into a processor of the automatic control system.

12. The apparatus for structuring a database as in claim 7 further comprising means for loading the compiled object code of the automatic control system control application and database headers into a memory of a processor of the automatic control system.

13. A method of structuring a database of an automatic call distributor for access by a third party software application and a control application of the automatic control system, the database being generated using a set of software modeling tools, such method comprising the steps of:

defining a set of parameters for the database;

implementing the database for the set of parameters under a standard query language using the modeling tools;

generating a set of database headers using the modeling tools; and compiling an object code for the control application and third party software application.

14. The method of structuring a database as in claim 13 wherein the step of implementing the database further comprises defining a set of tables for the set of parameters.

15. The method of structuring a database as in claim 14 wherein the step of defining a set of tables further comprises structuring the set of tables into the database.

16. The method of structuring a database as in claim 13 further comprising the step of loading the compiled third party software into a terminal associated with the database.

17. The method of structuring a database as in claim 13 further comprising the step of loading the compiled object code of the control application into a processor of the automatic call distributor.

18. The method of structuring a database as in claim 13 further comprising the step of loading the compiled object code and database headers into a memory of a processor of the automatic call distributor.

* * * * *